(12) United States Patent
Lim

(10) Patent No.: US 6,901,671 B2
(45) Date of Patent: Jun. 7, 2005

(54) LEVEL CAPABLE TO MEASURE MINUTE INCLINATION

(76) Inventor: Seung-Jin Lim, 101-306 Jungheung APT., Singchang-Dong, Gwangsan-Gu, Gwangju-Si 506-306 (KR)

( * ) Notice: Subject to any disclaimer, the term of this patent is extended or adjusted under 35 U.S.C. 154(b) by 0 days.

(21) Appl. No.: 10/715,047

(22) Filed: Nov. 17, 2003

(65) Prior Publication Data
US 2004/0187330 A1 Sep. 30, 2004

(30) Foreign Application Priority Data
Mar. 28, 2003 (KR) ................... 10-2003-0020911

(51) Int. Cl.⁷ .................................. G01C 9/18
(52) U.S. Cl. ............................... 33/390; 33/384
(58) Field of Search .................... 33/384, 385, 390, 33/374, 375

(56) References Cited

U.S. PATENT DOCUMENTS

| | | | | | |
|---|---|---|---|---|---|
| 2,526,493 A | * | 10/1950 | McCoy | .................. | 33/390 |
| 2,586,194 A | * | 2/1952 | Wochner | .................. | 33/335 |
| 2,645,030 A | * | 7/1953 | Mahone | .................. | 33/390 |
| 2,767,483 A | * | 10/1956 | Sauer, Jr. | .................. | 33/373 |
| 3,030,710 A | * | 4/1962 | Fell | .................. | 33/390 |
| 5,177,873 A | * | 1/1993 | Tate | .................. | 33/385 |
| 5,806,196 A | * | 9/1998 | Gibbs et al. | .................. | 33/333 |
| 6,477,781 B1 | * | 11/2002 | Blatt | .................. | 33/384 |

* cited by examiner

Primary Examiner—Christopher W. Fulton
(74) Attorney, Agent, or Firm—Ladas & Parry LLP

(57) ABSTRACT

The present invention relates to a level. More particularly, the present invention relates to a right/left and vertical level that is capable of right/left and verticality/horizontality measurement at the same time, and is capable of exactly measuring an inclined angle and a minute inclination angle. Therefore, the verticality and horizontality of the right and left can be measured through one work and their inclined directions and angles can be simply and exactly measured. Further, a fine inclined angle (1° unit) of an object can be measured. It is thus possible to improve the efficiency of a worker in construction fields, shorten working hours, and thus improve the efficiency of the work.

3 Claims, 5 Drawing Sheets

LEVEL CAPABLE TO MEASURE MINUTE INCLINATION

BACKGROUND OF THE INVENTION

1. Field of the Invention

The present invention relates to a level, and more particularly, to a right/left and vertical level that is capable of measuring the right/left and verticality/horizontality at the same time and also exactly measuring an inclined angle and a minute inclination angle.

2. Description of the Related Art

In general, in engineering and construction fields, the measurement of horizontal and vertical states, the measurement of a remote horizontal location from a given location, and the measurement of a remote vertical location from a given location are important and basic works. A level has been used for these measurements.

In other words, the level that has been widely used to measure the horizontal state in the construction fields includes a tube 100 filled with liquid, wherein the tube contains a bubble 200, as shown in FIG. 5*a*. It is determined that an object to be measured is at the horizontal state when the bubble 200 is located at the center of the tube 100.

The level, however, can measure only the horizontality depending on the axial direction, but could not measure the horizontality covering all the directions. As shown in FIG. 5*b*, the level may include a circular measurement unit 300. At this time, if a bubble 200 contained within the unit 300 is located at the center of the unit 300, it is determined to be horizontal. As the location of the bubble is changed over the entire circumference of 360° along its inclined direction, a level capable of measuring the inclination over all the directions along the X-Y coordinate axis has been widely used.

However, the conventional level could measure only which plane is horizontal or which plane is slanted, but could not measure detailed slant angle. Further, there is a problem that it could not measure the right/left and the horizontality/verticality at a time.

For example, Korean Utility Model Registration No. 2002-0006153 issued to the present applicant discloses a multi-functional spherical level having a spherical and transparent inclination measurement sphere 400, as shown in FIG. 6. The inclination measurement sphere 400 is filled with liquid containing a given bubbler 500. A plurality of angular scales 600 are formed by a given distance on the surface of the inclination measurement sphere 400. Using the inclination measurement sphere 400, it is possible to measure the right/left and the horizontality/verticality of an object to be measure at a time and to measure the angle of their inclinations.

However, since the conventional level is formed spherically, the distance where the bubbler within the inclination measurement sphere moves along the spherical inner surface of the sphere becomes shorter than the distance where the bubbler moves on the plane. For this reason, there occurs a problem that it is difficult to measure correctly minute inclination of an object to be measure.

SUMMARY OF THE INVENTION

The present invention is contrived to solve the aforementioned problems. An object of the present invention is to provide a spherical level that can simultaneously measure the right/left and the verticality/horizontality at a time, measure their inclined directions and angles, and easily measure minute inclination.

Another object of the present invention is to provide a level capable of fine inclination measurement, including a stick member having four rectangular planar members joined along an elongated central axis to form a cross sectional profile of "+"; a base member having a through hole having a center and being connected a to the stick member, wherein the base member is bounded by two rectangular planar members, and further wherein the perpendicular axis running through the center of the through hole is perpendicular to the elongated central axis of the stick member; a circular rotatory plate having an insertion axis inserted into the through hole of the base member at its center one side, wherein the circular rotatory plate rotates on the base member; a resilient member provided on the insertion axis, for adhering the rotatory plate to the base member with a given resilient force; a bolt member screwed to the end of the insertion axis in an axis direction, for supporting the resilient member; and an inclination measurement sphere provided at one side of the rotatory plate, wherein the inclination measurement sphere has one side of a flat or semi-spherical shape and the other side of a large radius of curvature being almost flat, and wherein scales of a given distance are indicated on an outer circumferential surface of the inclination measurement sphere.

More preferably, one side of the base member is formed centering on the through hole. The level further includes a circular adhesion groove having the inner circumferential surface that is inclined; teeth grooves formed on the inner circumferential surface of the adhesion groove, wherein the teeth grooves have cross sections of a "V" shape and 36 in number by a distance of 10°; and a plurality of hanging protrusions formed with slant on the outer circumferential surface of the rotatory plate so that the rotatory plate is inserted/adhered to the adhesion groove, wherein the hanging protrusions are inserted into the teeth grooves on the outer circumferential surface of the rotatory plate.

Furthermore, the level further includes an indicator for identifying the location of the teeth grooves and the hanging protrusions, on the outer circumferential surface of the close adhesion groove and the rotatory plate.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

The present invention will now be described in detail in connection with preferred embodiments with reference to the accompanying drawings.

Figure 1:
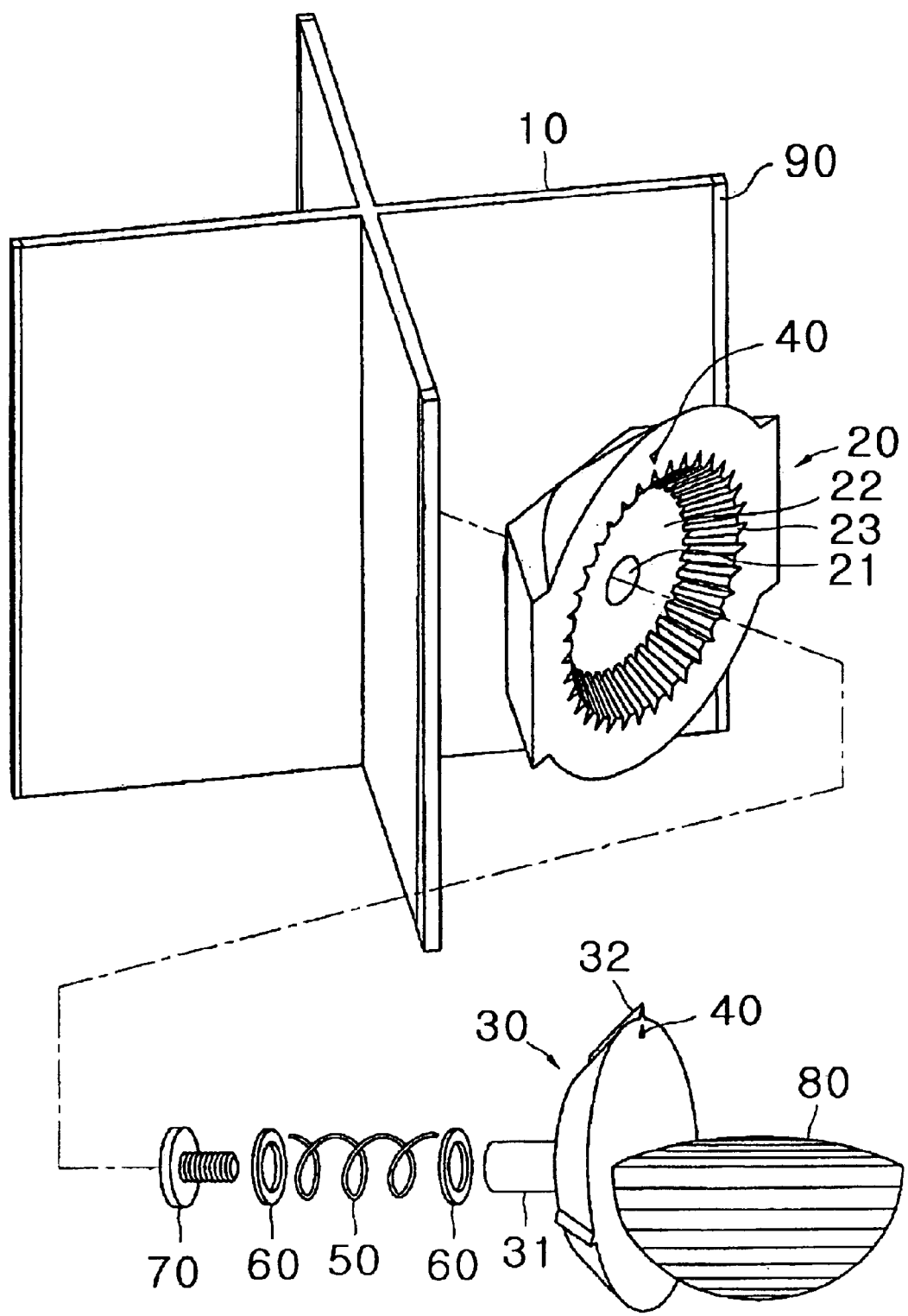
FIG. 1 is a perspective view illustrating a level capable of measuring the right/left and the verticality/horizontality according to the present invention.
Figure 2A:
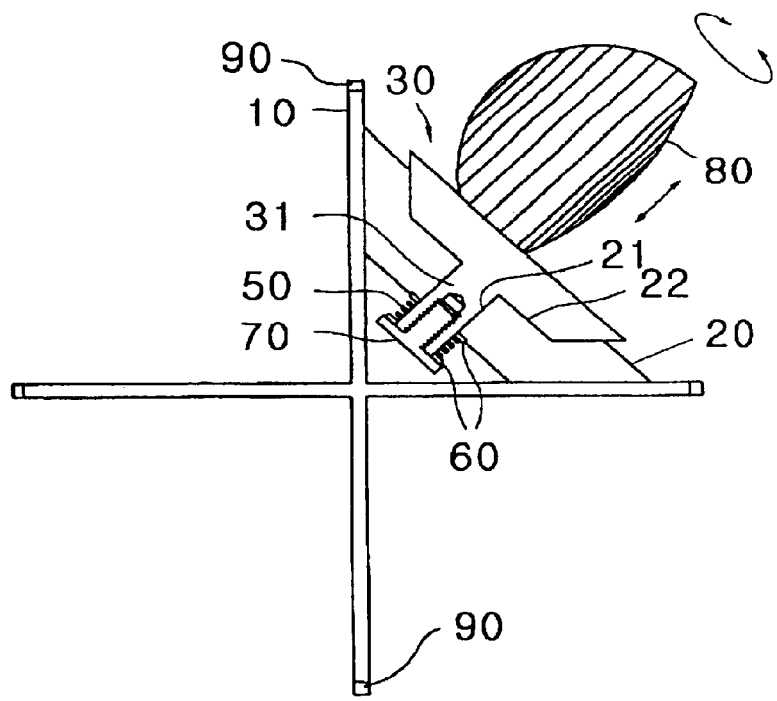
FIG. 2*a* and FIG. 2*b* are traversing sectional views of levels capable of measuring the right/left and the verticality/horizontality according to the present invention according to the present invention.
Figure 2B:
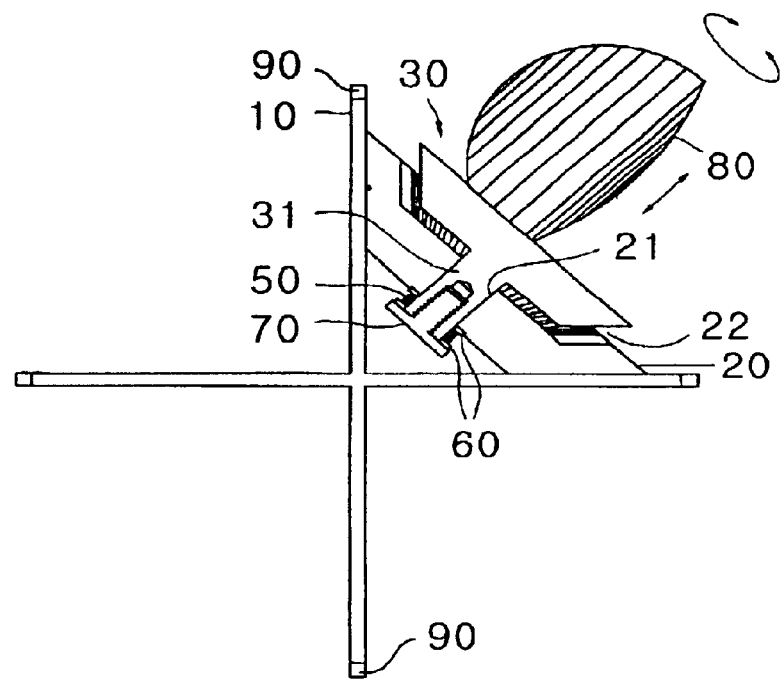
Figure 3:
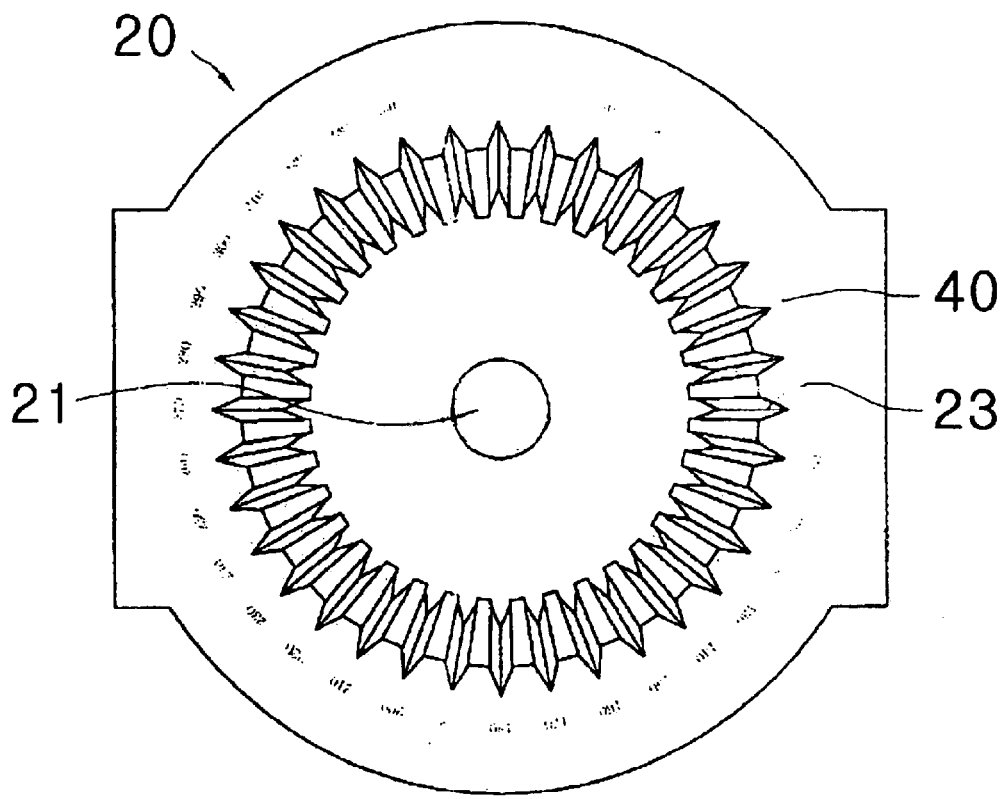
FIG. 3 is a front view illustrating a base member of the level capable of measuring the right/left and the verticality/horizontality according to the present invention.

FIG. 1 is a perspective view illustrating a level capable of right/left and verticality/horizontality measurement according to the present invention, FIG. 2a and FIG. 2b are traverse sectional views of levels capable of measuring the right/left and the verticality/horizontality according to the present invention according to the present invention, and FIG. 3 is a front view illustrating a base member of the level capable of measuring the right/left and the verticality/horizontality according to the present invention.

As shown in the drawings (particularly with respect to FIG. 1), the level according to an embodiment of the present invention includes, inter alla, a base member 20 and a stick member 10 resembling two rectangular planar members perpendicularly intersecting each other at a central axis forming a cross sectional profile of a "+". As shown in FIG. 1, the stick member 10 would have four sections around the central axis of the "+" cross sectional profile. Each of the four sections are bounded by two rectangular planar members (such as 90) joining along the central axis. The base member 20 is connected to the stick member 10 in one of the sections.

As shown in FIG. 1, the base member 20 has teeth grooves 23, close adhesion grooves 22, and a through hole 21. The teeth grooves 23 have a plurality of teeth formed along the circumference of a circle. The through hole 21 is also circular in shape. It is noted that the circle of the through hole 21 and the circle of the teeth grooves 23 are concentric, that is, the centers of the two circles lie in a common axis (hereinafter referred to as the "through hole common axis"). This is clearly shown in FIG. 3. The base member 20 is connected to the stick member 10 so that the through hole common axis perpendicularly pass through the central axis of the member 10. Further, a circular close adhesion groove 22 is formed centering on the through hole 21.

An inner circumferential surface of the close adhesion groove 22 is inclined and a plurality of teeth grooves 23 are formed along the inner circumferential surface of the close adhesion groove 22 at the inclined portion of the inner circumferential surface.

It is preferred that the number of the teeth grooves 23 is 36 having with them spaced 10°.

Meanwhile, the base member 20 includes a circular rotatory plate 30 having an insertion axis 31 at its central one side. The insertion axis 31 is inserted into the through hole 21 of the base member 20.

Preferably, the outer circumferential surface of the rotatory plate 30 is inclined so that it is seated onto the close adhesion groove 22 of the base member 20. It is preferable that hanging protrusions 32 of about 3 in number mated with the teeth grooves 23 of the close adhesion groove 22 are formed on the outer circumferential surface of the rotatory plate 30.

Meanwhile, an indicator 40 for identifying the location of the teeth grooves 23 and the hanging protrusions 32 is formed on the outer circumferential surface of the close adhesion groove 22 and the rotatory plate 30. At this time, it is preferred that the angle is indicated in range of 10° to 360° in a 10° unit on the outer circumferential surface of the close adhesion groove 22.

Furthermore, a resilient member (circular spring) 50 is inserted into the insertion axis 31. Flat washers 60 are positioned at both sides of the resilient member 50. Thus, the flat washers 60 and the resilient member 50 are fixed by a bolt member 70 that is coupled to the end of the insertion axis 31 in an axial direction.

An inclination measurement sphere 80 is formed at one side of the rotatory plate 30. The inclination measurement sphere 80 has one side of a flat or semi-spherical sphere and the other side of a large radius of curvature being almost flat. The sphere 80 can measure the verticality and horizontality since a bubbler of a given size flows therein.

Nine rows of the scales with them spaced 10° are formed on the semi-spherical surface of the inclination measurement sphere 80. At this time, the scales are formed to have the radius of curvature greater than the semi-spherical sphere so that the angle that can be measured as the bubbler flows on the other side of the semi-spherical surface.

A method of using the level according to the present invention will now be described.

A user rotates the rotatory plate having the inclination measurement sphere to locate the bubbler within the inclination measurement sphere at the center of the sphere with the stick member vertical to the ground.

The rotatory plate can be rotated by pulling the rotatory plate from the base member to separate the hanging protrusions of the rotatory plate from the teeth grooves. After rotation of a given angle, if the force applied to the rotatory plate is released, the rotatory plate is closely adhered to the close adhesion groove of the base member by means of the resilient member provided on the insertion axis of the rotatory plate. At this time, the hanging protrusions and the teeth grooves are mated one another.

After the bubbler within the inclination measurement sphere is located at the center of the sphere due to the rotation of the rotatory plate, the +-shaped stick member of the present invention is completely adhered to the edge of a subject whose right/left and verticality/horizontality are to be measured.

At this time, the stick member has a horizontal sectional plane of the "+" shape. Therefore, it can be easily adhered to the edge and outer circumferential surface of a subject to be measured, thus making the measurement easy.

Further, a magnet member for easily measuring an object such as a metal, etc., may be provided at one side of the +-shaped stick member.

Figure 4:
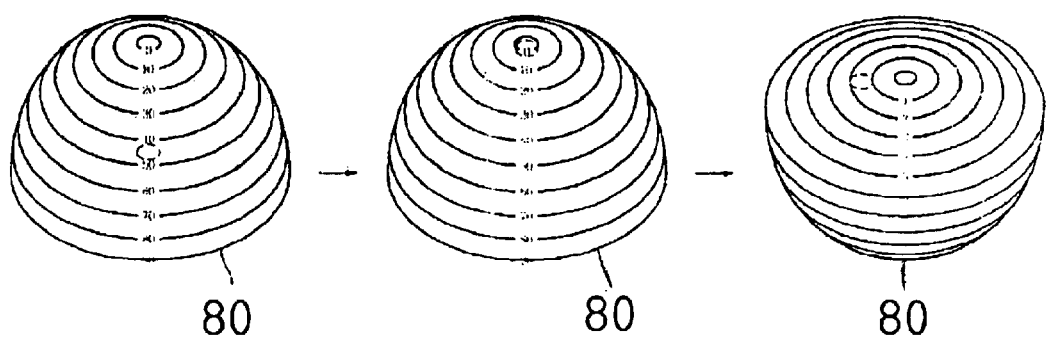
FIG. 4 illustrates a procedure of measuring the level capable of measuring the right/left and the verticality/horizontality according to the present invention.
Figure 5A:
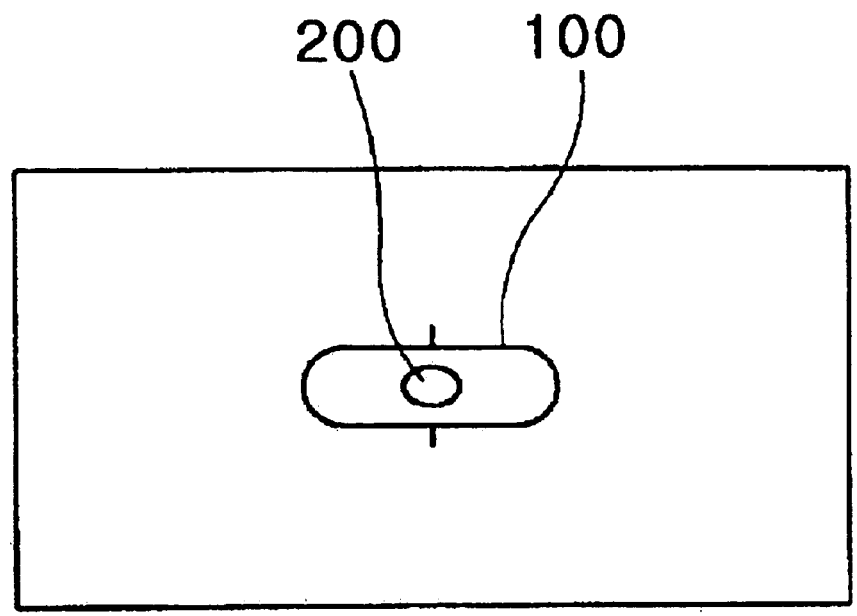
FIG. 5*a* and FIG. 5*b* are perspective views illustrating conventional levels.
Figure 5B:
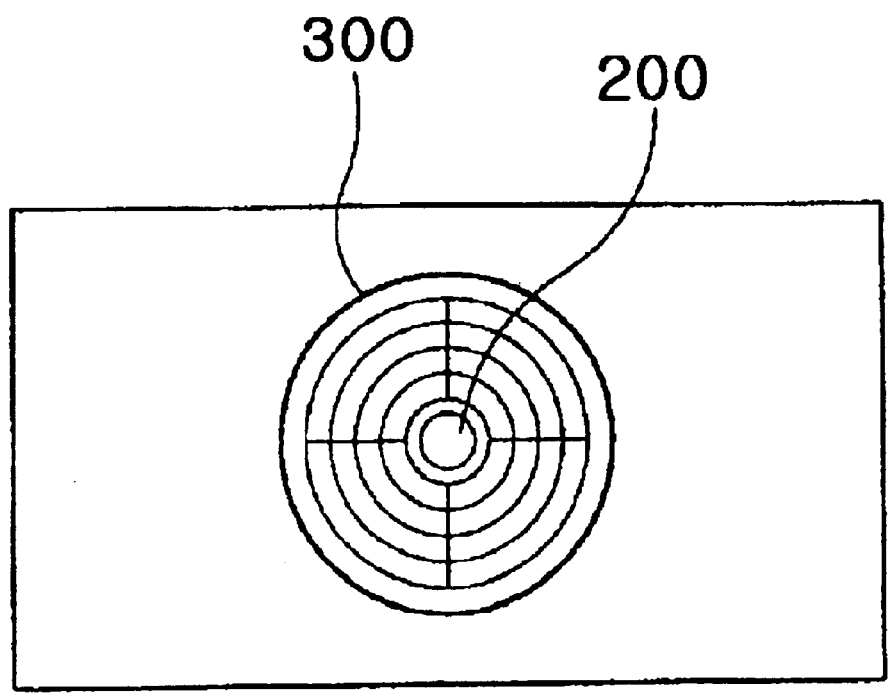
Figure 6:
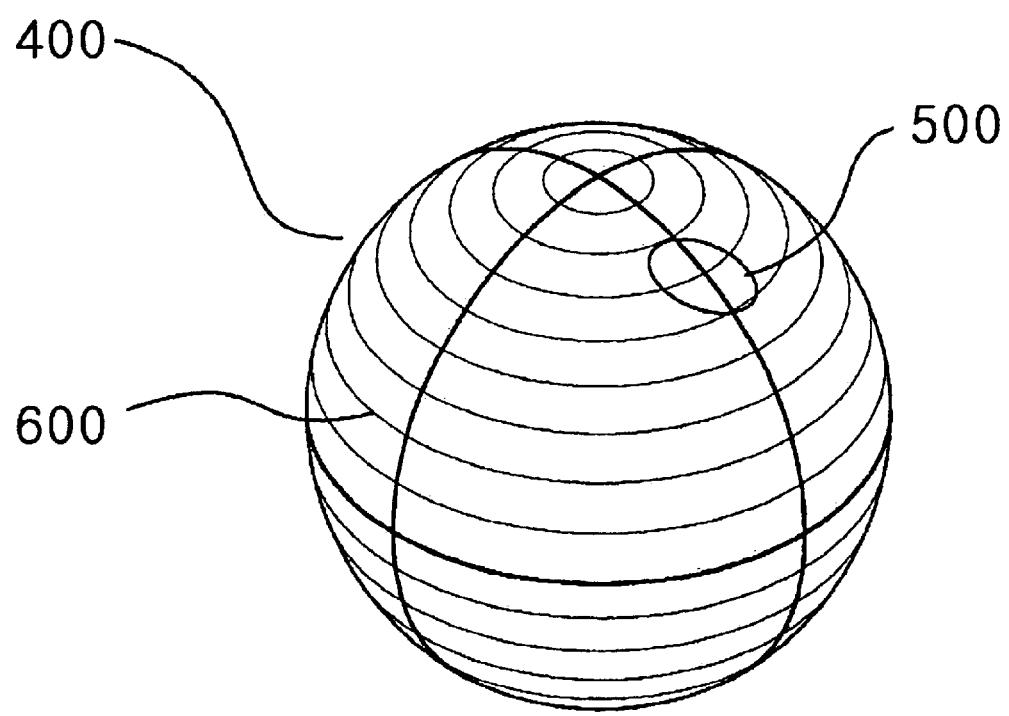
FIG. 6 is a perspective view illustrating an inclination measurement sphere in a conventional spherical level.

FIG. 4 illustrates a procedure of measuring the level capable of right/left and verticality/horizontality measurement according to the present invention.

Next, the location of the bubbler within the inclination measurement sphere has to be measured. In view of the inclination measurement sphere, the bubbler flows on the inner circumferential surface of the semi-sphere surface and is then located at a specific position as shown in FIG. 4.

The user can measure an inclined angle of an object to be measured in a 10° unit between 0° to 90° based on the bubbler located on the semi-sphere surface.

In order to measure a fine angle, the rotatory plate having the inclination measurement sphere is rotated in a state where the stick member contacts an object to be measured. At this time, the rotatory plate is rotated until the bubbler of the inclination measurement sphere is located at the center of the semi-sphere surface.

Thereafter, the rotatory plate is rotated 180° so that the bubbler is moved to the opposite side to the semi-sphere surface of the inclination measurement sphere surface.

At this time, the bubbler is stopped at a given location on the opposite side to the semi-sphere surface.

The scales are formed by a distance of 1° on the opposite side of the semi-sphere surface. The inclined angle of the bubbler can thus be measure by a distance of 1°.

Therefore, the inclined angle of an object to be measured by subtracting the angle of 1° unit that was measured on the opposite side of the semi-sphere surface from the angle of 10° unit that was measured on the first semi-sphere surface.

In other words, the user can exactly measure a fine inclined angle (1° unit) of an object to be measure.

As described above, according to the present invention, the verticality and horizontality of the right and left can be measured through one work and their inclined directions and angles can be simply and exactly measured. Further, a fine inclined angle (1° unit) of an object can be measured. It is thus possible to improve the efficiency of a worker in construction fields, shorten working hours, and thus improve the efficiency of the work.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

What is claimed is:

1. A level capable of fine inclination measurement, comprising:
    a stick member having four rectangular planar members joined along an elongated central axis to form a cross sectional profile of "+";
    a base member having a through hole having a center and being connected to the stick member, wherein the base member is bounded by two rectangular planar members, and further wherein the perpendicular axis running through the center of the through hole is perpendicular to the elongated central axis of the stick member;
    a circular rotatory plate having an insertion axis inserted into the through hole of the base member at its center one side, wherein the circular rotatory plate rotates on the base member;
    a resilient member provided on the insertion axis, for adhering the rotatory plate to the base member with a given resilient force;
    a bolt member screwed to the end of the insertion axis in an axis direction, for supporting the resilient member; and
    an inclination measurement sphere provided at one side of the rotatory plate, wherein the inclination measurement sphere has one side of a flat or semi-spherical shape and the other side of a large radius of curvature being almost flat, and wherein scales of a given distance are indicated on an outer circumferential surface of the inclination measurement sphere.

2. The level as claimed in claim 1, wherein one side of the base member is formed centering on the through hole, and further comprising:
    a circular adhesion groove having the inner circumferential surface that is inclined;
    teeth grooves formed on the inner circumferential surface of the adhesion groove, wherein the teeth grooves have cross section of a "V" shape and 36 in number with them spaced 10°; and
    a plurality of hanging protrusions formed with slant on the outer circumferential surface of the rotatory plate so that the rotatory plate is inserted/adhered to the adhesion groove, wherein the hanging protrusions are inserted into the teeth grooves on the outer circumferential surface of the rotatory plate.

3. The level as claimed in claim 1, further comprising an indicator for identifying the location of the teeth grooves and the hanging protrusions, on the outer circumferential surface of the close adhesion groove and the rotatory plate.

* * * * *